6736X

T. Ewbank,

Steam Safety Valve.

Patented Aug 27, 1831.

AM. PHOTO-LITHO. CO. N.Y. (OSBORNE'S PROCESS)

Thomas Ewbank

The Schedule, referred to in these Letters Patent and making part of the same, containing a description in the words of the said Thomas Ewbank himself, of his improvement in the safety valve for Steam Engine Boilers denominated the Hydrostatic Safety Valve.

Figure 1:
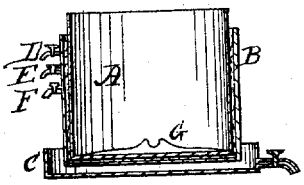
Figure 2:
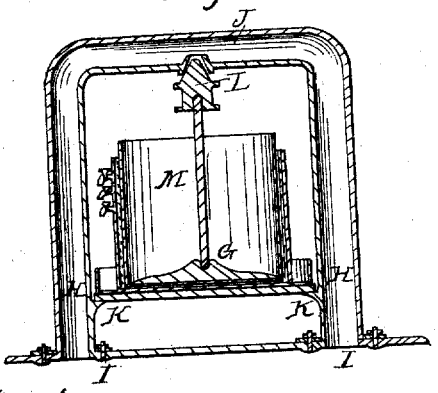
Figure 4:
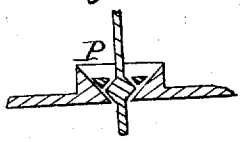
Figure 3:
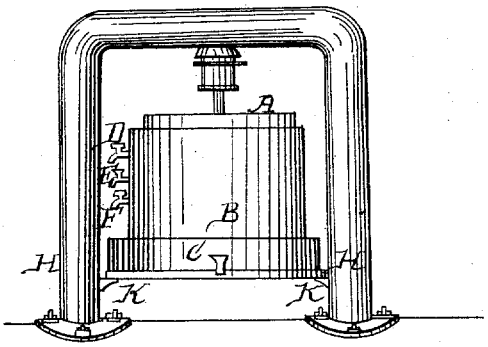
Figure 5:
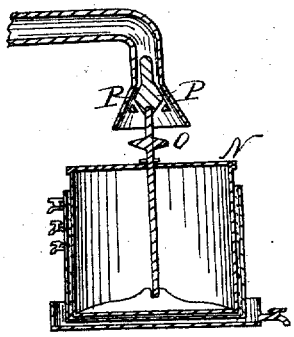

To all whom it may concern: be it known that I Thomas Ewbank, of the city of New York have invented a new safety valve for the boilers of Steam Engines which I denominate the Hydrostatic Safety valve, and that the following is a full and exact description thereof. The form of my safety valve may be the same as that ordinarily used, namely a truncated cone; instead however of being pressed downwards in the usual way, it is pressed upwards by the weight of a column of water, mercury or other fluid. In the accompanying drawings those parts which are similar in the different figures, are represented by the same letters. Figure 1. represents a section of the vessels by means of which the hydrostatic pressure is made. A is a cylindrical vessel which may be open at top but is closed at bottom, this is placed within a second vessel B. which is to contain water or other fluid, by which the pressure is to be made. It is evident that when the vessel A is placed within the vessel B and water is poured into the cavity between them, A will be pressed upwards, with a force proportioned to the area of the bottom of A & the altitude of the fluid in the cavity. C. is a shallow vessel in which B stands and is intended to receive any fluid which may escape from B. D, E, F. are cocks [illegible] in B to regulate the height of the fluid and consequently to graduate the pressure, say to 50, 40, 30. and 20 lbs to the square inch. G is a disk of wood or other light material, intended to stiffen the bottom of A and which may also serve to receive the lower end of the valve rod, each end of which passes into cavities without the use of joints, as ordinarily made. Fig. 2 is a section of the valve in action. H H is a tube one or both ends of which, open into the boiler at II. The inverted valve seat is seen at I in the upper part of this tube. K K are ledges to support the hydrostatic apparatus above the boiler, a piece of plank or other bad conductor is usually first placed upon the ledges. The valve L is drilled deeply on its lower side to receive the rod M the lower end of which rests on G. Fig 3 is a perspective view of the whole apparatus, the graduation by means of the cocks being represented by figures. [illegible] the steam in blowing off pressing downwards, I usually place a cover on the vessel L as shown at B fig
2. a hole left in the centre of this cover allows the rod to play through, and a
collar O formed upon the rod may cover the hole. Fig 3 represents a valve
in its usual position, this section shows two holes drilled thro the valve at
PP. I intend sometimes to drill a number of such holes, to prevent or lessen
that adhesion which is known to men of science, as having been described by
Mr Clement, The same provision is shown at Fig 4. These holes I intend in
some instances to connect together, by turning grooves on the face of the valve
removing a portion of metal between them. By the arrangement here described
the danger which arises from overloading the safety valve, is entirely obviated, or
rendered so difficult and so palpable if attempted, as to afford complete security in
this sense. I have thus given particular exemplification, of the principle
upon which my improved valve operates, not however intending to confine
myself to the precise arrangement herein set forth, as this may be varied
by modified, whilst the general principle remains unchanged. What I
claim as my invention, is the employment of Hydrostatic pressure to close
the safety valve; the using the valve in the inverted position; the passing the
ends of the valve rod into cavities prepared to receive them without the use
of joints: and the drilling of holes thro the valve as above described, in order
to prevent adhesion — or grooves instead Thomas Ewbank A Kirtland
Jno Varick Fedigh } Witnesses

[illegible] myl.

689 wds